US012569789B2

(12) United States Patent
Jung et al.

(10) Patent No.: US 12,569,789 B2
(45) Date of Patent: Mar. 10, 2026

(54) WATER PURIFIER

(71) Applicant: COWAY CO., LTD., Gongju-si (KR)

(72) Inventors: Hee Do Jung, Seoul (KR); Chan Jung Park, Seoul (KR); Woong Jung, Seoul (KR); Hyun Goo Kim, Seoul (KR); Jong Hwan Lee, Seoul (KR); Yoo Won Oh, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 365 days.

(21) Appl. No.: 18/248,810

(22) PCT Filed: Oct. 14, 2021

(86) PCT No.: PCT/KR2021/014231
§ 371 (c)(1),
(2) Date: Apr. 12, 2023

(87) PCT Pub. No.: WO2022/080889
PCT Pub. Date: Apr. 21, 2022

(65) Prior Publication Data
US 2023/0415080 A1 Dec. 28, 2023

(30) Foreign Application Priority Data

Oct. 14, 2020 (KR) ........................ 10-2020-0132960
Aug. 3, 2021 (KR) ........................ 10-2021-0102052

(51) Int. Cl.
B01D 35/30 (2006.01)
B01D 29/13 (2006.01)
C02F 1/00 (2023.01)

(52) U.S. Cl.
CPC ........... B01D 35/306 (2013.01); B01D 29/13 (2013.01); C02F 1/003 (2013.01); B01D 2201/301 (2013.01); C02F 2307/10 (2013.01)

(58) Field of Classification Search
CPC .... C02F 1/003; C02F 1/00; C02F 1/44; C02F 1/28; C02F 2307/10; C02F 2201/004;
(Continued)

(56) References Cited

U.S. PATENT DOCUMENTS 9,422,182 B2 8/2016 Timmer
2009/0301975 A1* 12/2009 Timmer ................. B01D 35/30
210/446

FOREIGN PATENT DOCUMENTS

JP 5180201 B2 4/2013
KR 10-0886866 B1 3/2009
(Continued)

OTHER PUBLICATIONS

KR 20180135265 A English description, Dec. 20, 2018, Sim Sang Gu et al.*
(Continued)

*Primary Examiner* — Akash K Varma
(74) *Attorney, Agent, or Firm* — Oblon, McClelland, Maier & Neustadt, L.L.P.

(57) ABSTRACT

A water purifier includes: a filter module having filters filtering raw water to provide purified water, and a filter connector having a filter connection passage allowing the filters to communicate with each other; and a filter housing having an open top and providing a filter accommodating space accommodating the filter module. The filter housing includes a filter fixture that is detachably coupled to one side of the filter connector, the filter fixture providing a flow path supplying the raw water to the filter module or discharging the purified water from the filter module to an outside. When the filter module accommodated in the filter accommodating space is coupled to the filter fixture, a separation distance between the filter connector and an inner wall of the filter housing facing the other side of the filter connector may be
(Continued)

greater than an overlapping length of the filter connector and the filter fixture.

7 Claims, 11 Drawing Sheets

(58) Field of Classification Search
CPC .. C02F 2201/006; C02F 2209/02; C02F 9/20; B01D 29/13; B01D 35/306; B01D 35/30; B01D 35/00; B01D 35/02; B01D 2201/301; B01D 61/02; B67D 1/00; B67D 1/08; B67D 1/07; B67D 1/0081; B67D 1/0842; B67D 1/0857; B67D 3/00; B67D 2210/0001; B67D 2210/00062; F16J 15/02
USPC .......................................................... 210/232
See application file for complete search history.

(56) References Cited

FOREIGN PATENT DOCUMENTS

| KR | 10-2015-0055866 | A |   | 5/2015 |   |   |
|----|-----------------|---|---|--------|---|---|
| KR | 20180135265 | A | * | 12/2018 | ............. | B01D 35/30 |
| KR | 10-2020-0083754 | A |   | 7/2020 |   |   |
| KR | 10-2132163 | B1 |   | 7/2020 |   |   |
| KR | 20200083758 | A | * | 7/2020 | ............. | B01D 35/30 |

OTHER PUBLICATIONS

KR 20200083758 A English description, Jul. 9, 2020, Kong Jong Ho et al.*
International Search Report mailed on Jan. 25, 2022 in PCT/KR2021/014231 filed on Oct. 14, 2021 (2 pages).

* cited by examiner

WATER PURIFIER

TECHNICAL FIELD

The present disclosure relates to a water purifier.

BACKGROUND ART

In general, a water purifier is a device that receives raw water from a raw water source such as tap water, filters the raw water into purified water through a filter provided therein, and then provides the purified water to a user. In addition, the purified water may be provided to the user as cold water cooled to a predetermined temperature or lower, or hot water heated to a predetermined temperature or higher by the water purifier.

Meanwhile, the filter provided inside the water purifier needs to be replaced when the life of the filter is exhausted by filtering water for a long time. In the past, when replacing the filter of the water purifier, due to the risk of malfunction due to incomplete connection, or malfunction of the water purifier due to water leakage when replacing the filter, a technician skilled in the water purifier had to replace the filter. Therefore, until the filter is replaced by the skilled technician, the user has no choice but to use the expired filter. In order to solve this inconvenience, some conventional water purifiers are provided with a separate attachment/detachment device so that ordinary users, not skilled technicians, can easily replace the filter.

In this regard, the present applicant's Korean Patent Application Publication No. 10-2018-0135265 "Filter mounting unit and water purifier including same" (Patent Document 1) discloses a water purifier including a lever member for attaching/detaching a filter member.

However, according to the water purifier disclosed in Patent Document 1, since the user has to rotate the lever member to remove the filter member from the water purifier, there is a problem in that it is inconvenient to replace the filter. In addition, since a separate space for accommodating the lever member is required, the volume of the water purifier increases, and thus there is a problem in that it does not meet the recent trend of miniaturization of the water purifier. In addition, according to the water purifier disclosed in Patent Document 1, when the user excessively rotates the lever member due to inexperienced operation, there is a problem that the lever member may be damaged.

In addition, according to Korea Patent Application Publication No. 10-2020-0083758 of Picogram Co., Ltd., "Lever type attachment/detachment device for water filter of water purifier" (Patent Document 2), an attachment/detachment device for a water purifier, which is capable of separating a water purifying filter from a flow path as a locking lever is rotated on a main body, is disclosed.

However, according to the water purifier disclosed in Patent Document 2, in order to remove the filter from the main body of the water purifier, the user has to rotate the locking lever in an up and down direction, so there it is inconvenient to replace the filter. In addition, since a separate space for accommodating the locking lever is required, the volume of the water purifier increases, and thus there is a problem in that it does not meet the recent trend of miniaturization of the water purifier.

PRIOR ART DOCUMENT (Patent Document 1) Korean Patent Publication No. 10-2018-0135265 (published on Dec. 20, 2018)

(Patent Document 2) Korean Patent Publication No. 10-2020-0083758 (published on Sep. 7, 2020)

DETAILED DESCRIPTION OF INVENTION

Technical Problems

In view of the above, embodiments of the present disclosure provide a water purifier in which a filter module can be moved backward in a filter housing to be separated from a filter connector.

Further, embodiments of the present disclosure provide a water purifier in which a separation distance between the filter connector and an inner wall of the filter housing is greater than a overlapping length between the filter connector and a filter fixture so that the filter module is moved in a front and rear direction within the filter housing.

Technical Solution

In accordance with an aspect of the present disclosure, there may be provided a water purifier including: a filter module including a plurality of filters for filtering raw water to provide purified water, and a filter connector having a filter connection passage that allows the plurality of filters to communicate with each other; and a filter housing having an open top and providing a filter accommodating space for accommodating the filter module therein, wherein the filter housing includes a filter fixture that is detachably coupled to one side of the filter connector, the filter fixture providing a flow path for supplying the raw water to the filter module or discharging the purified water provided from the filter module to an outside of the filter housing, and wherein in a state in which the filter module accommodated in the filter accommodating space is coupled to the filter fixture, a separation distance between the filter connector and an inner wall of the filter housing facing the other side of the filter connector is greater than an overlapping length of the filter connector and the filter fixture.

Further, the filter fixture may be fixed in the state in which the filter module is coupled to the filter fixture and in a state in which the filter module is separated from the filter fixture.

Further, the water purifier may further include: a filter cap provided on an upper side of the filter housing, the filter cap being movable in an up and down direction and selectively coupled to the filter housing to form the filter accommodating space with the filter housing.

Further, the filter cap may include a seating rib protruding downward to surround a peripheral surface of the filter support in the filter cap, and the seating rib may interfere with the filter module when the filter module is separated from the filter fixture, and prevent the filter module from being separated from the filter fixture when the filter module is coupled to the filter fixture.

Further, the filter housing may further include a housing coupling portion located between the plurality of the filter fixture, wherein the filter cap may further include a filter cap coupling portion for being coupled to the housing coupling portion, and wherein one of the housing coupling portion and the filter cap coupling portion may be a coupling protrusion, and the other of the housing coupling portion and the filter cap coupling portion may be a coupling groove into which the coupling protrusion is to be inserted.

Further, in a state in which the filter cap is coupled to the filter housing, the filter connector may be disposed between the filter fixture and the seating rib.

Further, the filter connector may further include a plurality of filter support parts engaged with the plurality of filters, respectively, to connect the filter connection passage and the plurality of filters, and the seating rib may include: a first rib part that surrounds each of peripheral surfaces of the plurality of filter support parts in the state in which the filter module is coupled to the filter fixture; and a second rib part disposed at the other side than the filter connection passage in the state in which the filter module is coupled to the filter fixture.

Effect of Invention

According to one aspect of the present disclosure, a user can replace the filter module connected to the filter connector by moving it backward in the filter housing.

In addition, since the separation distance between the filter connector and the inner wall of the filter housing may be greater than the overlapping length of the filter connector and the filter fixture, the user can move the filter module forward and backward in the filter housing.

BEST MODE FOR CARRYING OUT THE INVENTION

Hereinafter, a preferred embodiment of the present disclosure for implementing the spirit of the present disclosure will be described in more detail with reference to the accompanying drawings.

However, in describing the present disclosure, detailed descriptions of known configurations or functions may be omitted to clarify the present disclosure.

When an element is referred to as being 'connected' to, 'supported' by, 'supplied' to, or 'flowed' into another element, it should be understood that the element may be directly connected to, supported by, supplied to, or flowed into other element, but that other elements may exist in the middle.

The terms used in the present disclosure are only used for describing specific embodiments, and are not intended to limit the present disclosure. Singular expressions include plural expressions unless the context clearly indicates otherwise.

Figure 1:
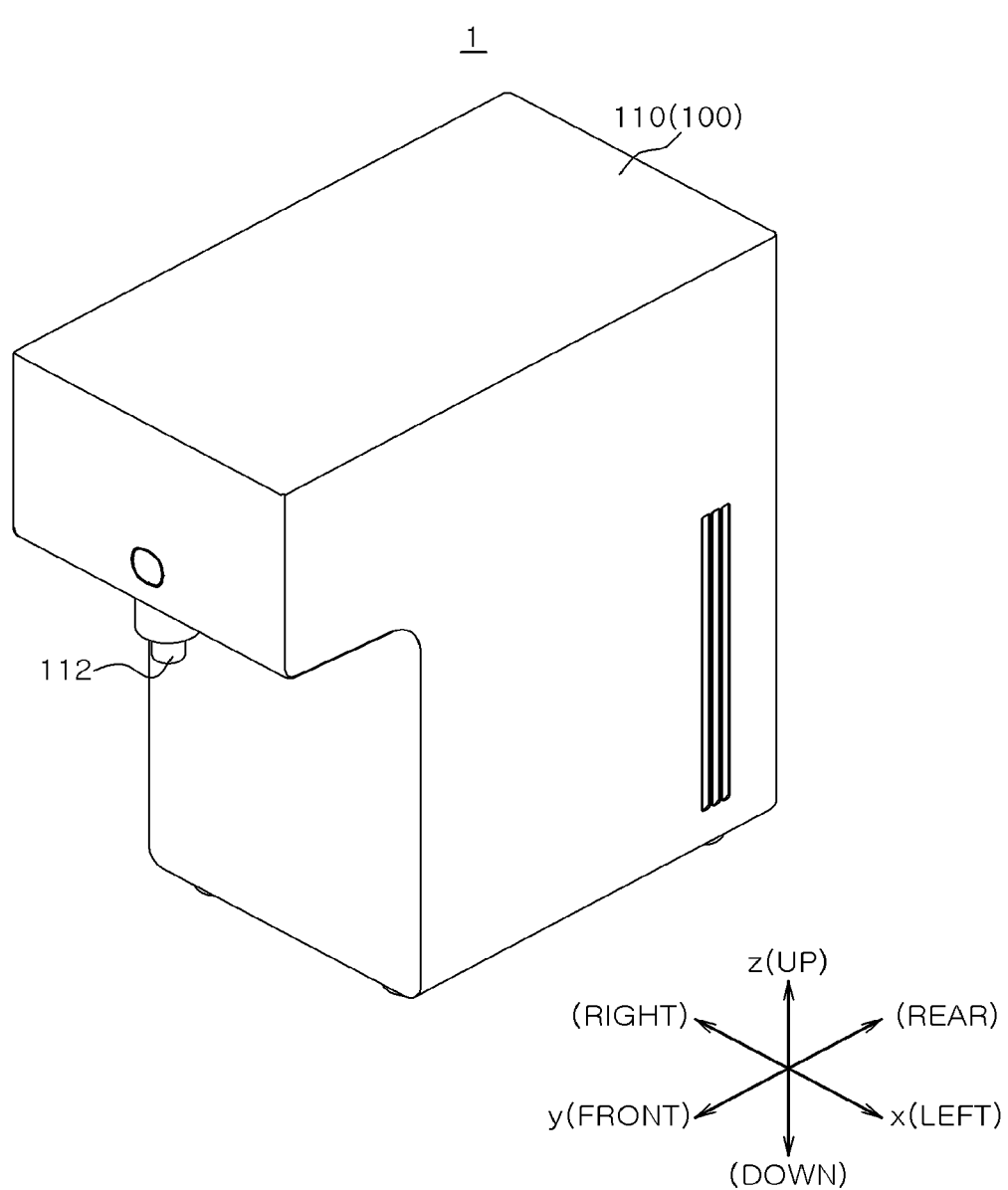
FIG. 1 is a perspective view of a water purifier according to one embodiment of the present disclosure.

Further, in the present disclosure, it is to be noted in advance that expressions, such as the upper side, the lower side, and the side surface are described based on the direction shown in FIG. 1. Further, some components are exaggerated, omitted, or schematically illustrated in the accompanying drawings, and the size of each component does not fully reflect the actual size.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

Hereinafter, a water purifier 1 according to one embodiment of the present disclosure will be described with reference to the drawings.

Referring to FIGS. 1 to 4, the water purifier 1 according to one embodiment of the present disclosure can provide clean water to a user by filtering water supplied from an outside. For example, the water purifier 1 can receive water from a water supply source (not shown) such as tap water, and filter the supplied water into clean water. The water purifier 1 includes a frame 100, a flow path module 200, a bracket 300, a separation preventing member 400, a filter assembly 500, a tubing assembly 600, a cooler 700, a heater 800, a cold water flow part 900, a NOS valve 1000, and a circuit board 1100.

Water introduced into the water purifier 1 from the outside may be divided into raw water, purified water, cold water, and hot water. Hereinafter, among water introduced into the water purifier 1 from the outside, water that has not passed through the filter assembly 500 is defined as raw water, and water filtered through the filter assembly 500 is defined as purified water. In addition, among the water filtered by the filter assembly 500, water cooled to a predetermined temperature or less in the cooler 700 is defined as cold water, and among the water filtered by the filter assembly 500, water heated to a predetermined temperature or higher by the heater 800 is defined as hot water.

The frame 100 may provide a space where the flow path module 200, the bracket 300, the separation preventing member 400, the filter assembly 500, the tubing assembly 600, the cooler 700, the heater 800, and the cold water flow unit 900, the NOS valve 1000 and the circuit board 1100 are accommodated. For example, the frame 100 may extend in the up and down direction, and may have a shape in which a part of an upper portion thereof protrudes forward. The frame 100 may include a main frame 110 and a cover frame 120.

The main frame 110 may surround at least a portion of the flow path module 200, the bracket 300, the separation preventing member 400, the filter assembly 500, the tubing assembly 600, the cooler 700, the heater 800, the cold water flow part 900, the NOS valve 1000, and the circuit board 1100. For example, the main frame 110 may be formed by coupling a plurality of cover members to each other with bolts or the like. In addition, the upper cover of the main frame 110 may be selectively separated. However, this is only an example, and other than the bolts, well-known means for coupling the plurality of cover members to each other may be used, and the side cover or the bottom cover may be selectively separated.

In addition, the main frame 110 may be provided with a discharge port 112 for discharging purified water to the outside. The discharge port 112 may communicate with the tubing assembly 600 and may be configured to discharge purified water, cold water, and hot water flowing in the tubing assembly 600 to the outside. For example, the discharge port 112 may be configured to discharge one of purified water, cold water, and hot water to the outside according to a user's selection. In addition, the discharge port 112 may be provided on a front side of the main frame 110 and may be open downward.

Referring again to FIGS. 2 and 3, the cover frame 120 may be supported by the bracket 300 to cover the flow path module 200 seated on the bracket 300. In addition, the cover frame 120 may be separated from the bracket 300 so that the flow path module 200 is exposed to the outside. In this case, the cover frame 120 may be fixedly supported on the main frame 110. However, this is only an example, and the cover frame 120 may be rotatably supported by the bracket 300 or the main frame 110. Further, the cover frame 120 may support the circuit board 1100 and wires connected to the circuit board 1100, and may be separated from the bracket 300 together with the circuit board 1100.

Figure 2:
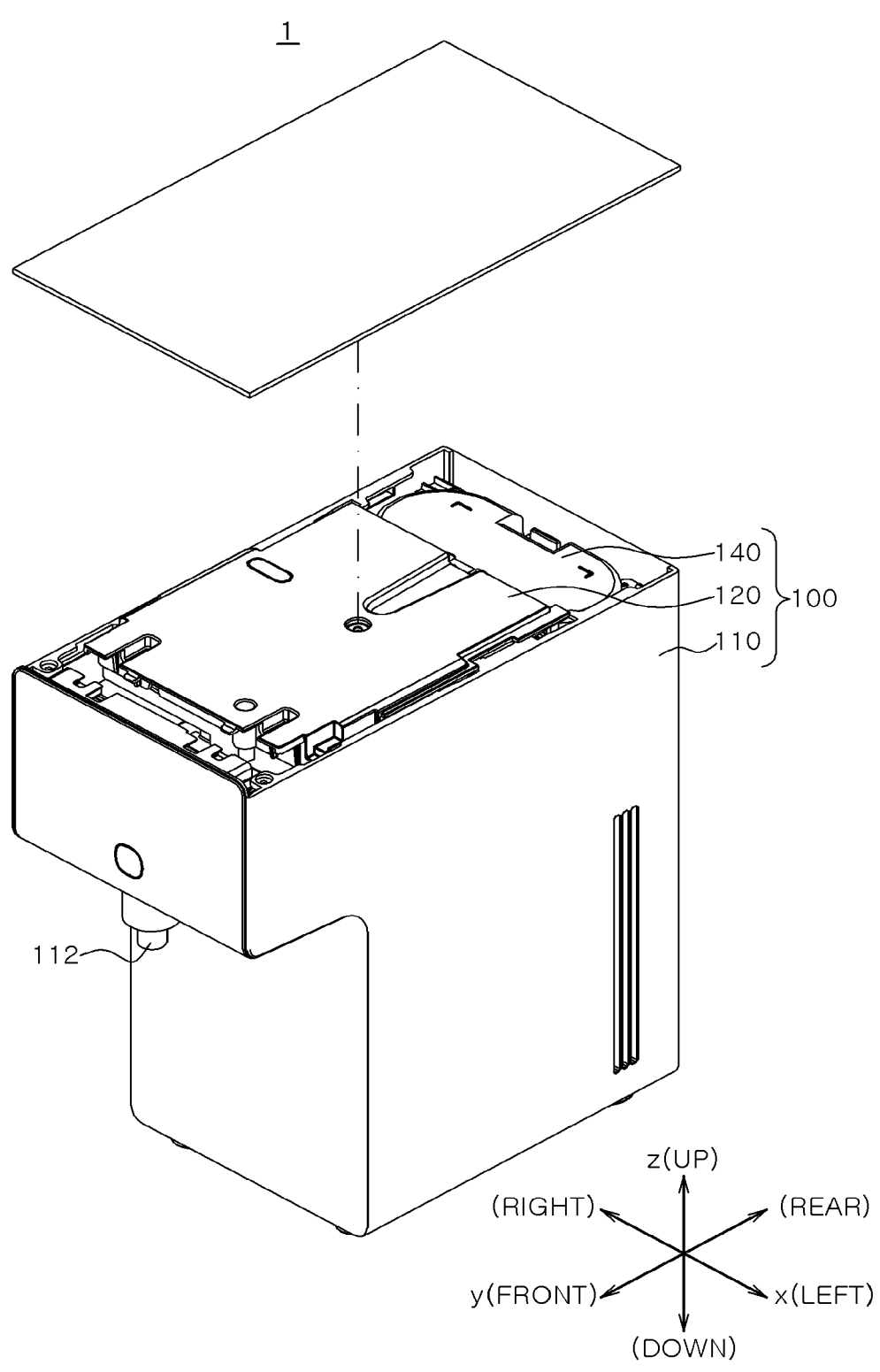
FIG. 2 is a perspective view in which an upper cover of the water purifier of FIG. 1 is removed.
Figure 3:
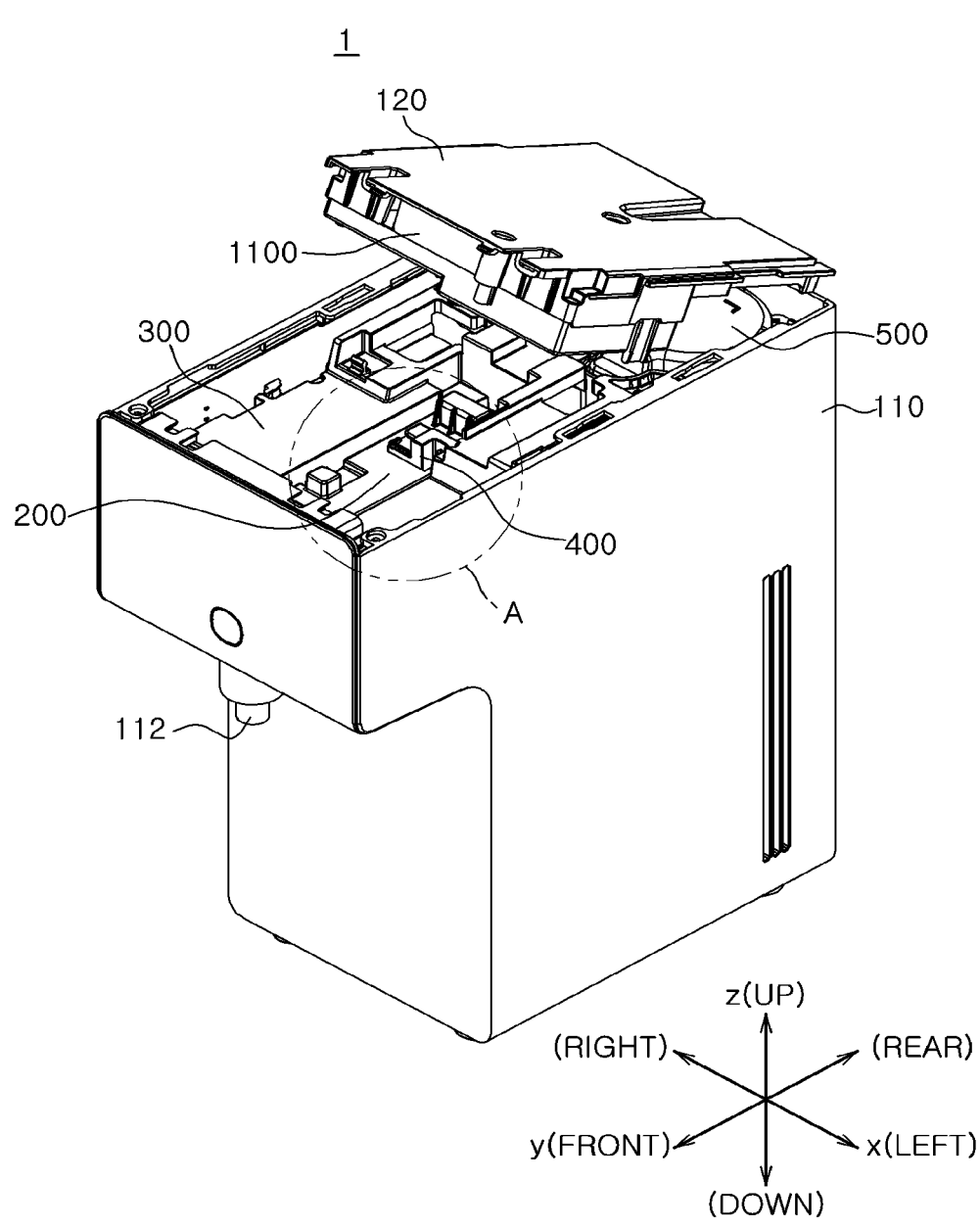
FIG. 3 is a perspective view illustrating a state in which the cover frame of FIG. 2 is rotated to an open position.
Figure 4:
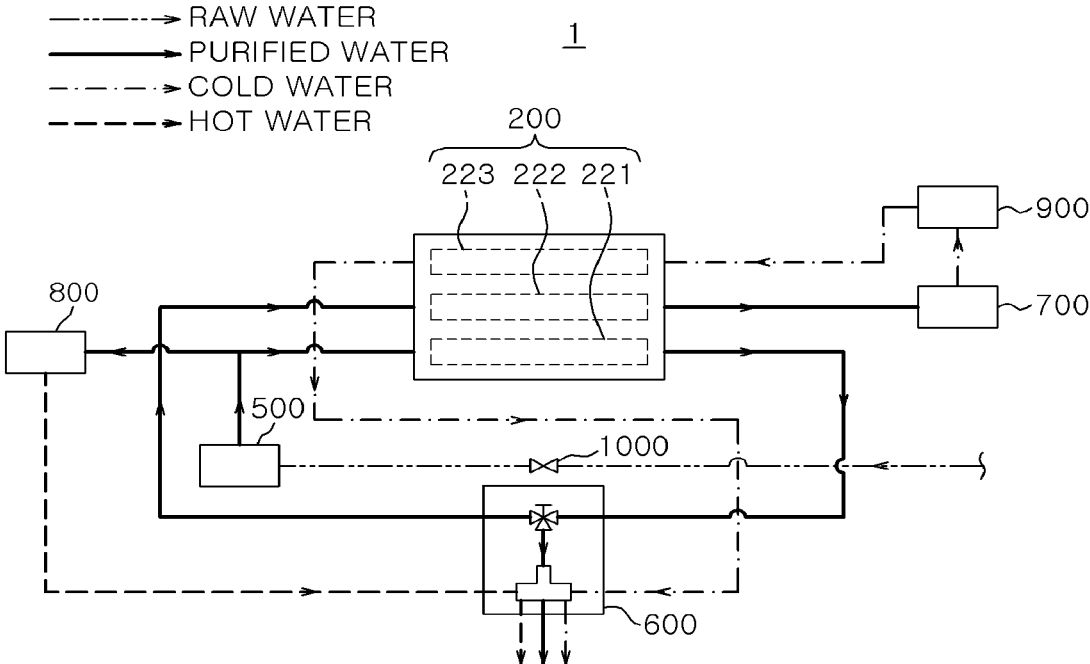
FIG. 4 is a conceptual diagram schematically illustrating a flow of water in the water purifier according to one embodiment of the present disclosure.

The cover frame 120 may be selectively placed in any one of a cover position and an open fixed position. For example, as shown in FIG. 2, the cover frame 120 may be placed in the cover position. In this case, the cover frame 120 may be positioned above the bracket 300 and the flow path module 200, and may block the flow path module 200 from the outside. As another example, as shown in FIG. 3, the cover frame 120 may be configured to be separable from the cover position so that the flow path module 200 is exposed to the outside. In other words, the cover frame 120 may be separated from the bracket 300, and the separated cover frame 120 may be placed in the open fixed position. In this case, upper portions of the bracket 300 and the flow path module 200 may be opened to the outside, and the flow path module 200 may be separated from the bracket 300 and replaced. In addition, the cover frame 120 placed in the open fixed position may be engaged and fixed to the main frame 110 in an inclined state with respect to the cover frame 120 in the cover position.

Figure 5:
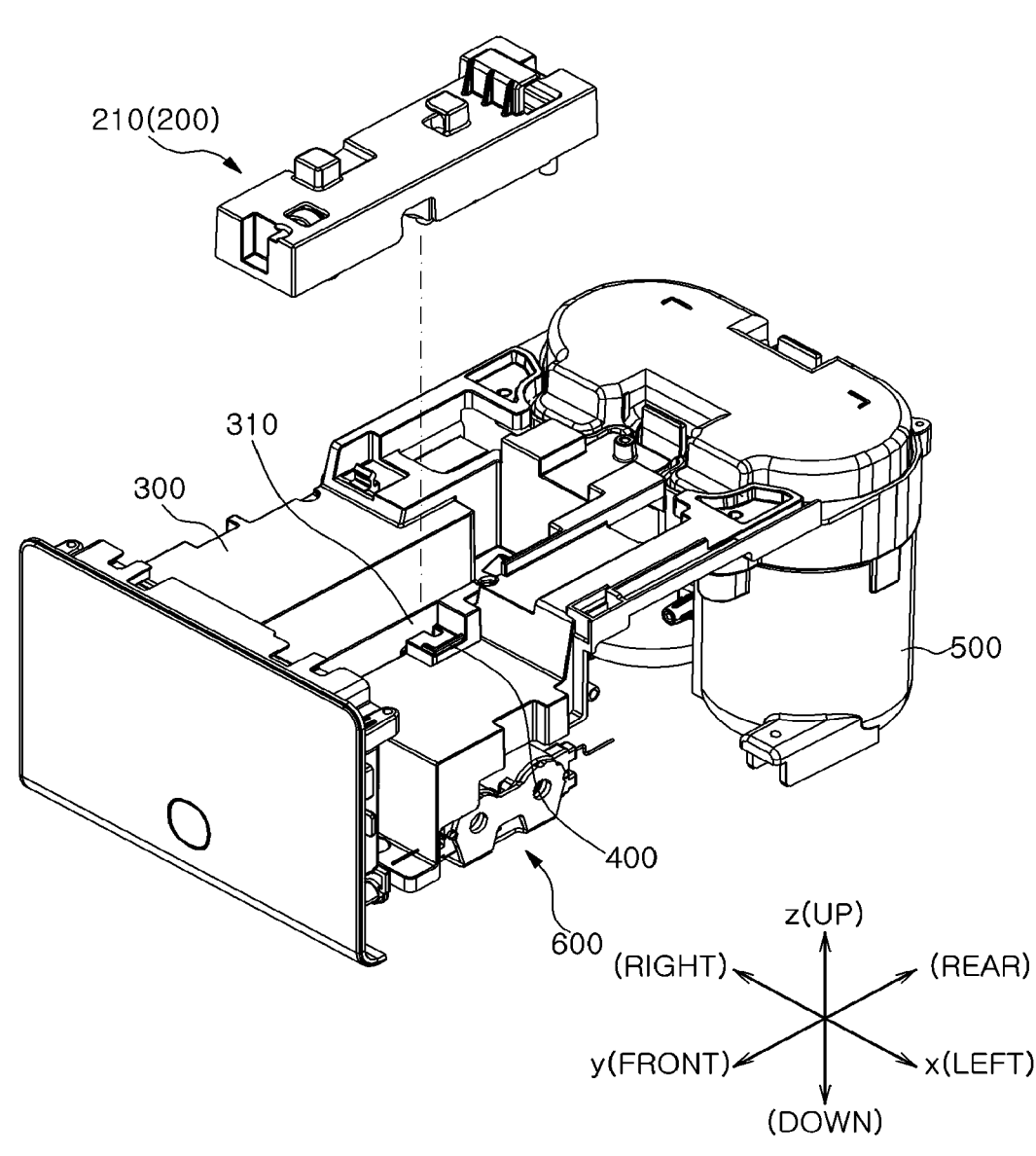
FIG. 5 is a partial perspective view illustrating an exploded state of a flow path module of FIG. 3.
Figure 6:
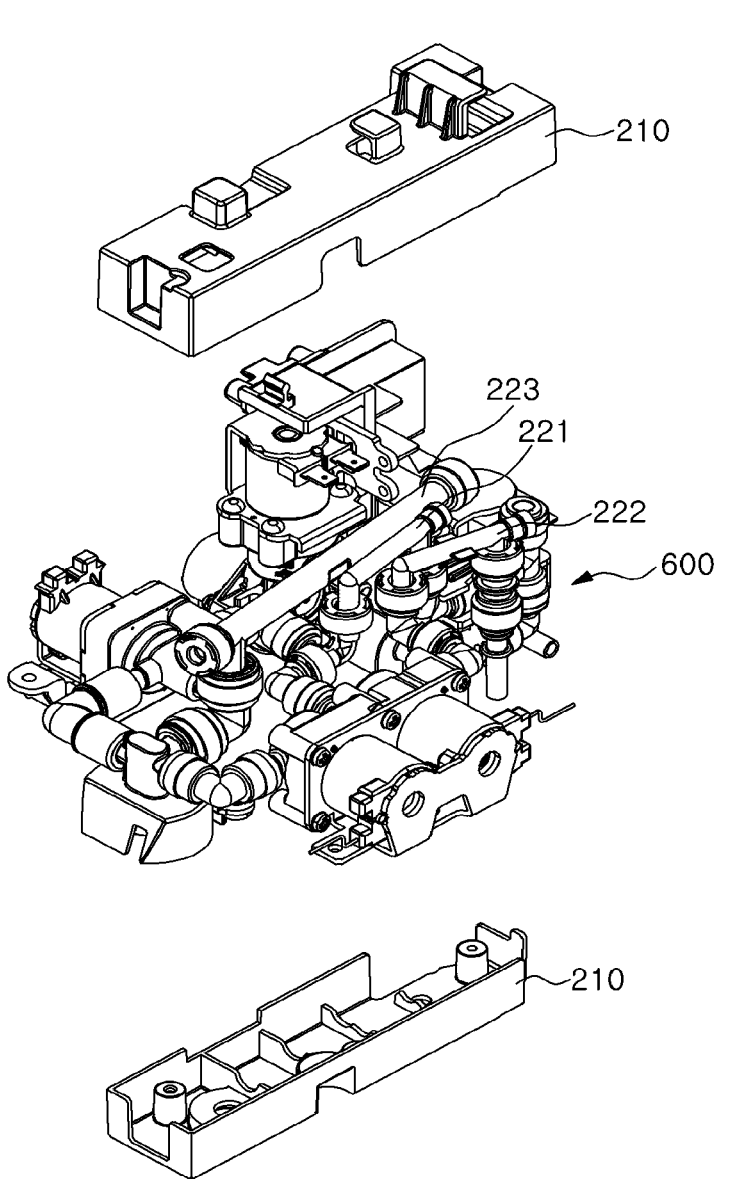
FIG. 6 is a perspective view illustrating an exploded state of a body part of the flow path module of FIG. 5.

Referring to FIGS. 5 and 6, the flow path module 200 may provide a passage through which purified water and cold water flow. The flow path module 200 can communicate with the tubing assembly 600 and is detachably connected to the tubing assembly 600. For example, when the flow path module 200 is connected to the tubing assembly 600, purified water and cold water may flow between the flow path module 200 and the tubing assembly 600. In addition, when the flow path module 200 is connected to the tubing assembly 600, the flow path module 200 may be supplied with purified water from the filter assembly 500 through the tubing assembly 600. The flow path module 200 may be indirectly connected to the filter assembly 500 through the tubing assembly 600 without being directly connected to the filter assembly 500. In other words, the flow path module 200 may be seated on a seating portion 310 of the bracket 300 to be described later, and may be connected to the tubing assembly 600 when the flow path module 200 is seated in a correct position. The correct position of the flow path module 200 means a position at which the flow path 200 is placed in a preset orientation and is seated to match the seating portion 310. When the flow path module 200 is not seated in the correct position, that is, when the flow module 200 is placed in an orientation different from the preset orientation or does not match the seating portion 310, the flow path module 200 interferes with the bracket 300 and is not connected to the tubing assembly 600.

The flow path module 200 is configured to communicate with the tubing assembly 600 when the flow path module 200 is seated in the correct position, so that the user can easily connect the flow path module 200 and the tubing assembly 600. In other words, when the user mounts the flow path module 200 in the correct position on the bracket 300, the flow path module 200 and the tubing assembly 600 can be connected without separate connection with another component. When viewed from above, at least a portion of the flow path module 200 may overlap with the tubing assembly 600. In addition, when viewed from above, the flow path module 200 is disposed between the filter assembly 500 and the discharge port 112, but may be disposed so as not to overlap with the filter assembly 500. In addition, when the flow path module 200 is seated in the correct position, the flow path module 200 may be placed higher than a temperature control unit. In this specification, it may be understood that the temperature control unit includes the cooler 700, the heater 800, and the cold water flow part 900. Further, the flow path module 200 may include a plurality of water pipes 222, 221, and 223.

The plurality of water pipes 222, 221, and 223 may be connected to the tubing assembly 600 and provide a flow space for purified water or cold water to flow. The plurality of water pipes 222, 221, and 223 may be separated from the tubing assembly 600 when the flow path module 200 seated on the seating portion 310 is separated from the bracket 300. In other words, since the user can separate the plurality of water pipes 222, 221, and 223 and the tubing assembly 600 by separating the flow path module 200 from the bracket 300, the plurality of water pipes 222, 221, and 223 can be replaced at once.

The bracket 300 may support the flow path module 200 and may provide a portion on which the flow path module 200 is seated. The bracket 300 may be supported on the main frame 110 and may be disposed on the upper side of the tubing assembly 600.

The separation preventing member 400 can prevent the flow path module 200 seated in the correct position on the seating portion 310 from being separated from the bracket 300. For example, the flow path module 200 seated in the correct position is connected to the tubing assembly 600, and water may flow between the flow path module 200 and the tubing assembly 600. When the flow path module 200 is separated from the seating portion 310 while the water is flowing between the flow path module 200 and the tubing assembly 600, the water leaks between the flow path module 200 and the tubing assembly 600. The separation preventing member 400 can prevent the flow path module 200 from being separated from the seating portion 310 so that the connection between the flow path module 200 and the tubing assembly 600 is maintained.

In addition, the separation preventing member 400 may be configured such that one end thereof is supported by the bracket 300 and the other end thereof selectively interferes with the upper side of the flow path module 200 seated in the correct position. For example, one end of the separation preventing member 400 may be rotatably supported by the bracket 300, and the other end thereof is rotated to the upper side of the body part 210 seated in the correct position, so that the separation preventing member 400 can prevent the body part 210 from being separated from the seating portion 310. When the separation preventing member 400 is placed on the upper side of the flow path module 200 to prevent the flow path module 200 from being separated, the cover frame 120 may be allowed to be placed in the cover position. For example, when the separation preventing member 400 is placed on the upper side of the flow path module 200, the cover frame 120 can be placed in the cover position.

In addition, when the other end of the separation preventing member 400 is not placed on the upper side of the flow path module 200 and the flow path module 200 is allowed to be separated from the seating portion 310, the separation preventing member 400 may interfere with the cover frame 120 so that the cover frame 120 could not be placed in the cover position. For example, when the separation preventing member 400 is rotated and the flow path module 200 can be separated from the seating portion 310, the cover frame 120 is caught by the separation preventing member 400 without being placed in the cover position.

When the flow path module 200 is in a separable state from the bracket 300, the separation preventing member 400 can allow the user to recognize that the flow path module 200 is in the separable state by preventing the cover frame 120 from being placed in the cover position. In this way, the user can check once again whether the separation preventing member 400 is not engaged with the flow path module 200. In addition, the separation preventing member 400 can maintain the connection between the flow path module 200 and the tubing assembly 600 by preventing the flow path module 200 seated in the correct position from being separated. Accordingly, it is possible to prevent water from leaking between the flow path module 200 and the tubing assembly 600 connected to each other.

Figure 7:
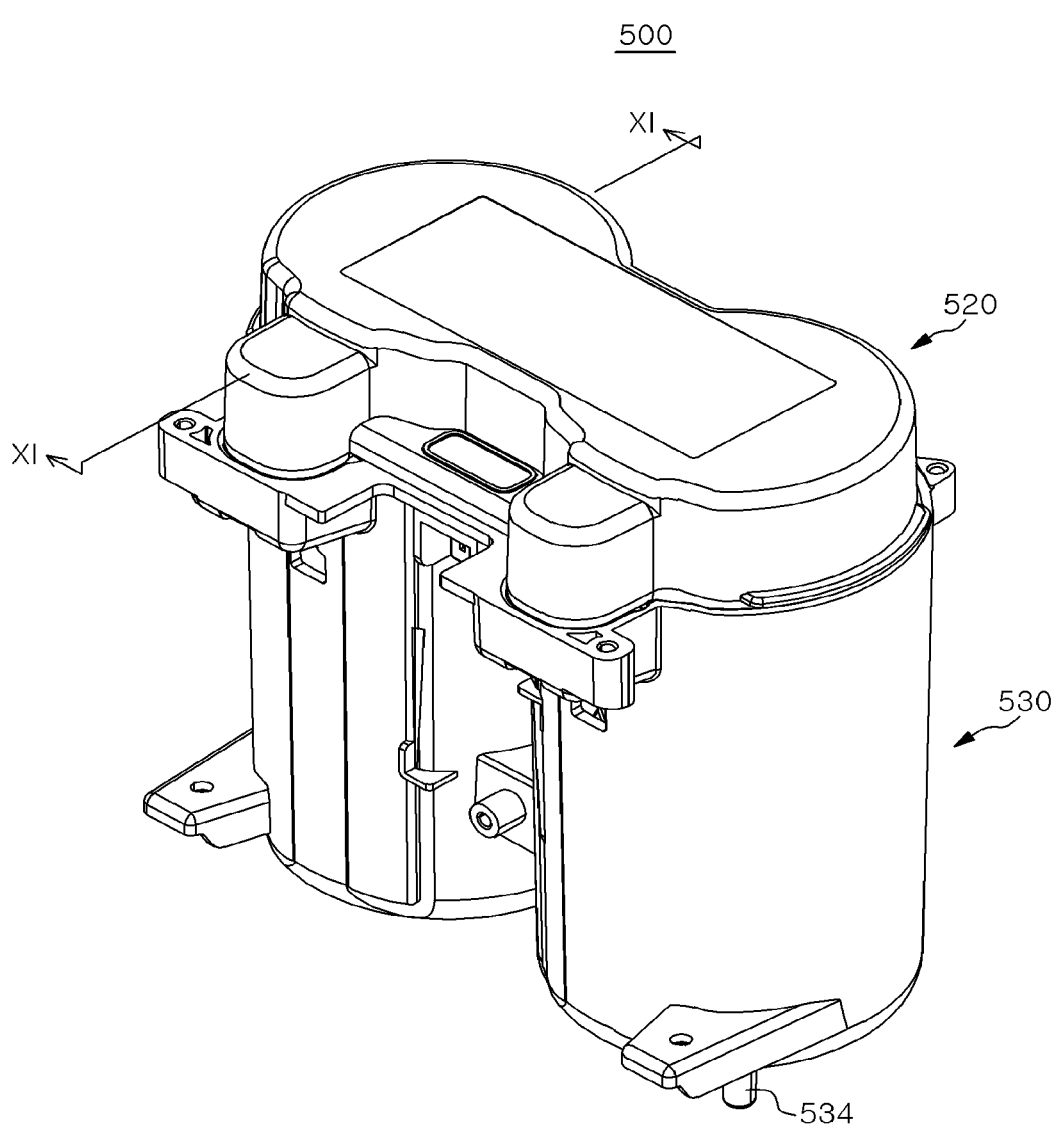
FIG. 7 is a perspective view illustrating a filter assembly of the water purifier according to one embodiment of the present disclosure.
Figure 8:
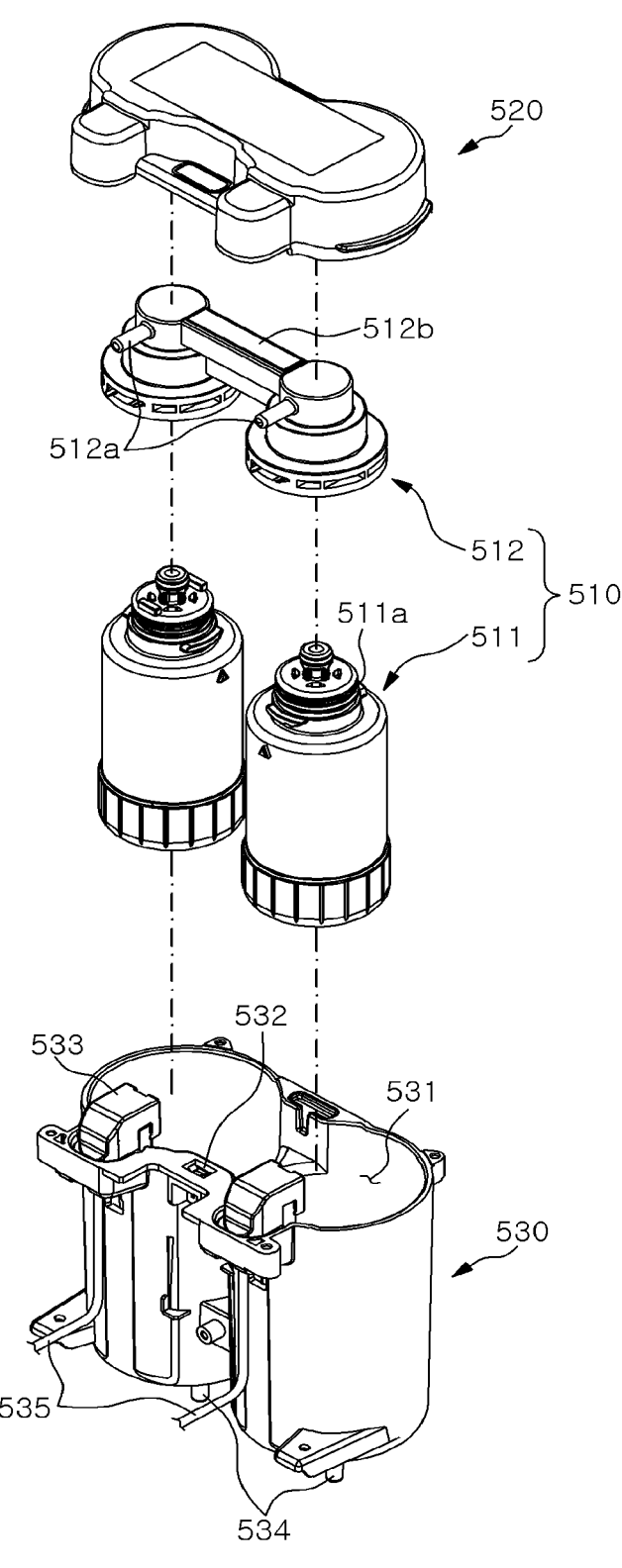
FIG. 8 is an exploded perspective view of the filter assembly of FIG. 7.

Referring to FIGS. 7 and 8, the filter assembly 500 may filter raw water introduced into the water purifier 1 to be purified water. For example, the filter assembly 500 may be disposed on a rear side of the water purifier 1. In addition, a filter housing 530 may be provided above a fan unit for heat dissipation of the cooler 700, the cold water flow part 900, and the cooler 700, and may be disposed behind the cover frame 120. The filter assembly 500 may be configured to be exposed when the upper cover of the main frame 110 is removed. The filter assembly 500 may include a filter module 510, a filter cap 520, and the filter housing 530.

The filter module 510 may include a filter medium to filter raw water introduced into the water purifier 1 to be purified water. In addition, the filter module 510 may be accommodated in the filter housing 530 and replaced, and may be detachably coupled to a filter fixture 533 to be described later. In other words, the filter module 510 may be in a state in which it is separated from the filter fixture 533 or in a state in which it is coupled to the filter fixture 533. For example, the filter module 510 can be moved forward toward the filter fixture 533 in a state accommodated in the filter housing 530 to be coupled to the filter fixture 533, and moved backward to be separated from the filter fixture 533. Further, the filter module 510 may receive raw water from the filter fixture 533 or provide purified water to the filter fixture 533. The filter module 510 may include a plurality of filters 511 and a filter connector 512.

The plurality of filters 511 may filter raw water to provide purified water. For example, one of the plurality of filters 511 may receive raw water, and another one may provide purified water. In addition, each of the plurality of filters 511 may be provided with a filter head 511a to be connected to the filter connector 512. The filter 511 may receive raw water or provide purified water through the filter head 511a.

The filter connector 512 may be connected to the plurality of filters 511. In addition, the filter connector 512 may be detachably coupled to one side that is the front side of the filter fixture 533. The filter connector 512 may guide the raw water provided from the filter fixture 533 to the filter 511, or guide the purified water provided from the filter 511 to the filter fixture 533. In addition, when the filter cap 520 is coupled to the filter housing 530, the filter connector 512 may be disposed between the filter fixture 533 and a seating rib 521 to be described later. The filter connector 512 may include a filter support part 512a and a filter connection passage 512b.

The filter support part 512a may be engaged with each of the plurality of filters 511 to connect the filter connection passage 512b and the plurality of filters 511. In addition, a filter mouse that can be selectively coupled to the filter fixture 533 may be formed on the filter support part 512a.

The filter connection passage 512b connects a plurality of filter support parts 512a, and a flow path may be provided in the filter connection passage 512b so that at least one of raw water and purified water flows between the plurality of filters 511 therein. In addition, when the user grips the filter connector 512 and lifts it upward, the plurality of filters 511 may be taken out from the filter housing 530 at once.

Figure 9:
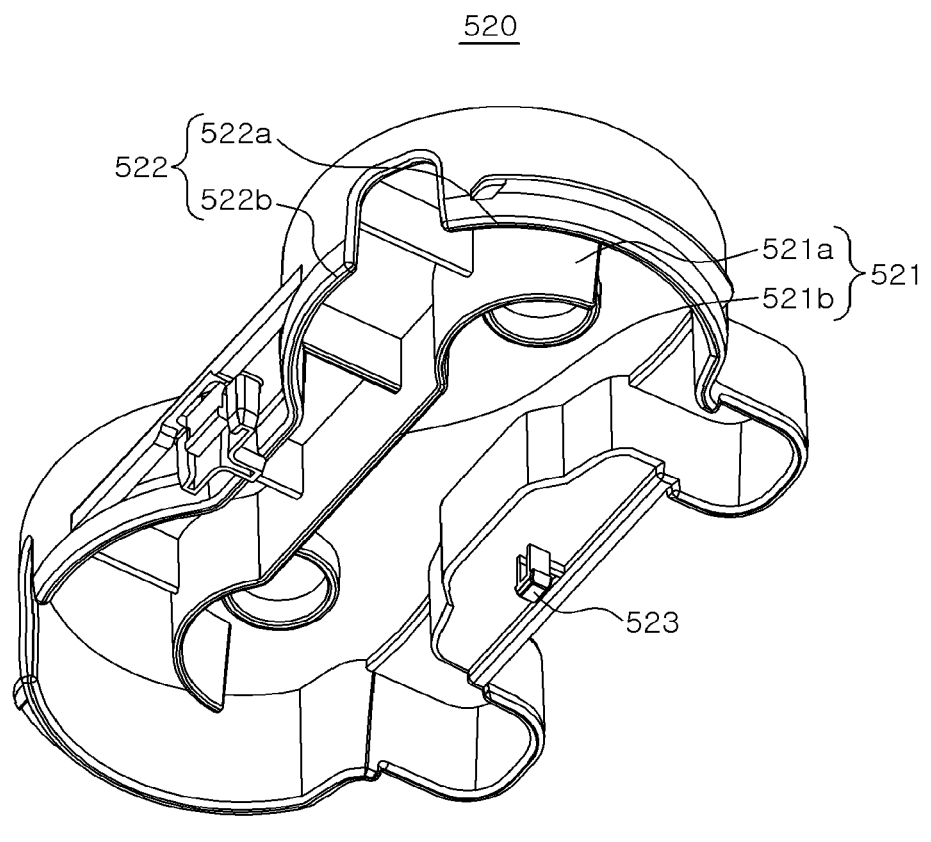
FIG. 9 is a bottom perspective view of a filter cap of the filter assembly of FIG. 7.
Figure 10:
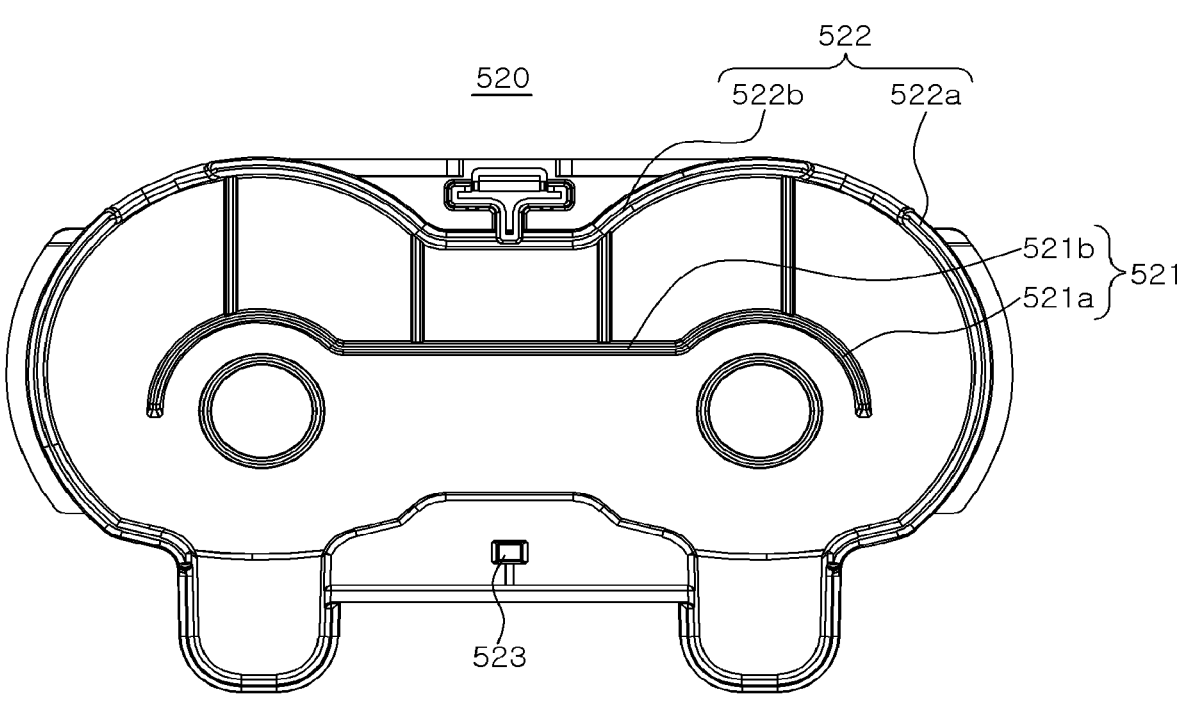
FIG. 10 is a bottom view of the filter cap of FIG. 9.

Referring to FIGS. 9 and 10, the filter cap 520 may be detachably coupled to the filter housing 530 to cover the upper side of the filter housing 530. In addition, the filter cap 520 may be configured to interfere with the filter connector 512 so as not to be coupled to the filter housing 530 in a state in which the filter module 510 is removed from the filter fixture 533. In other words, when the filter cap 520 would not be coupled to the filter housing 530, the user may recognize that the filter module 510 is not properly coupled to the filter fixture 533. In addition, when the filter cap 520 is coupled to the filter housing 530, it may accommodate at least a portion of the filter fixture 533. The seating rib 521, a guide 522, and a filter cap coupling portion 523 may be formed in the filter cap 520.

The seating rib 521 may protrude downward to surround at least a portion of a peripheral surface of the filter connector 512 inside the filter cap 520. Further, the seating rib 521 may be disposed on the rear side of the filter connector 512 in a state in which the filter module 510 is coupled to the filter fixture 533. The seating rib 521 may interfere with the filter module 510 in a case where the filter cap 520 is erroneously coupled to the filter housing 530 or the filter module 510 is removed from the filter fixture 533. In addition, the seating rib 521 may include a first rib part 521a and a second rib part 521b.

In the state in which the filter module 510 is coupled to the filter fixture 533, the first rib part 521a may surround peripheral surfaces of the plurality of filter support parts 512a, respectively.

The second rib part 521b may be disposed on the rear side of the filter connection passage 512b in the state in which the filter module 510 is coupled to the filter fixture 533. Further, the second rib part 521b may be connected to a plurality of first rib parts 521a.

The guide 522 protrudes downward from a lower end of the filter cap 140 to guide the filter cap 140 when it is coupled to the filter housing 530. The guide 522 may be in contact with an inner surface of the filter housing 530 when the filter cap 520 is coupled to the filter housing 530. The guide 522 may include a side guide 522a and a rear guide 522b. The side guide 522a is formed at each of the lower ends of both sides of the filter cap 520 to guide the coupling of the filter cap 520. The rear guide 522*b* may be formed at the lower end of a front side of the filter cap 140 to guide the coupling of the filter cap 520.

The filter cap coupling portion 523 may be coupled to a housing coupling portion 532 of the filter housing 530 which will be described later. In addition, the filter cap coupling portion 523 may be formed on the front side of the filter cap 520. The filter cap 520 and the filter housing 530 may be maintained in a coupled state by the filter cap coupling portion 523, or may be separated from each other. In addition, any one of the filter cap coupling portion 523 and the housing coupling portion 532 may be a coupling protrusion, and the other may be a coupling groove into which the coupling protrusion can be inserted. For example, the filter cap coupling portion 523 may be a snap protrusion that can be selectively pressed by the user, and the housing coupling portion 532 may be a snap groove to which the snap protrusion is coupled. In other words, the user can separate the filter cap 520 from the filter housing 530 by pressing the filter cap coupling portion 523.

Figure 11:
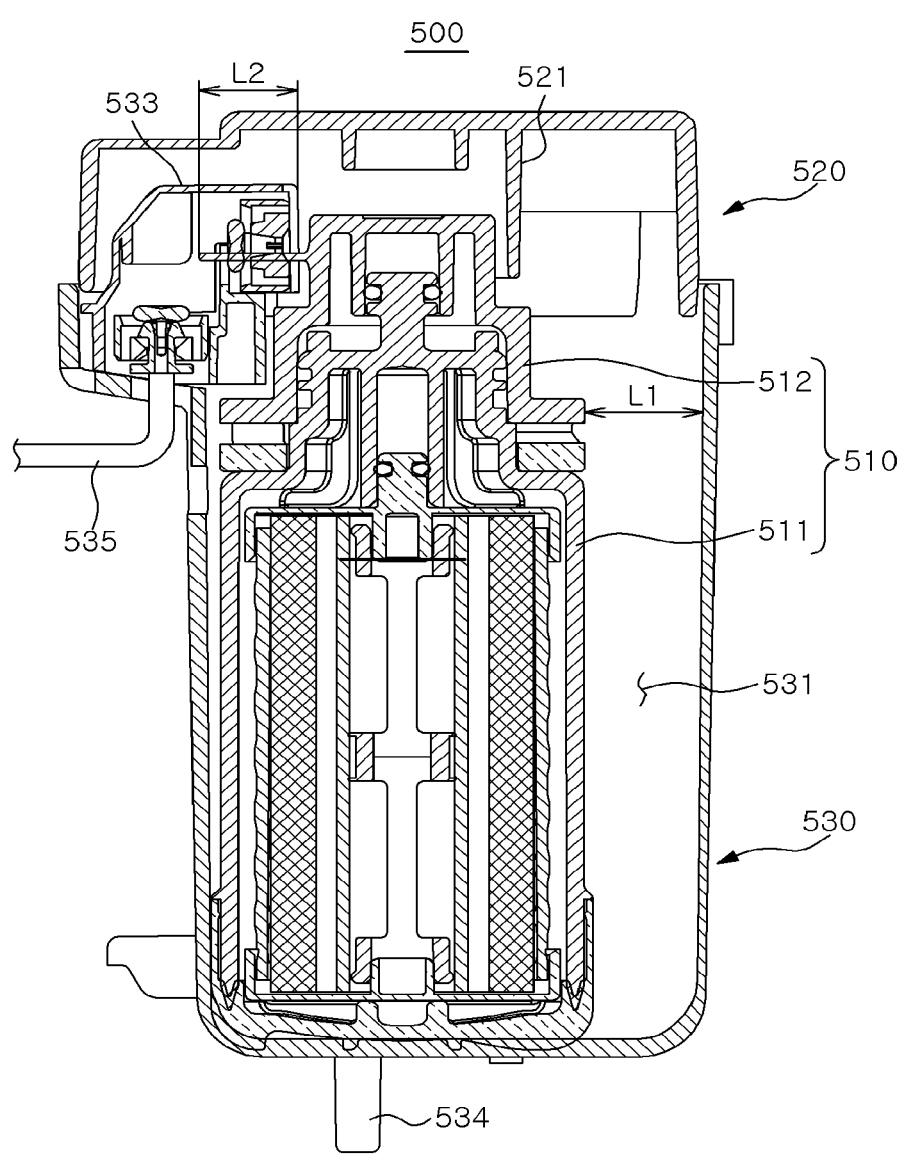
FIG. 11 is a cross sectional view of the filter assembly of FIG. 7 taken along line XI-XI.

Referring further to FIG. 11, the filter housing 530 has an open top and may accommodate the filter module 510 therein. The filter housing 530 may be integrally formed with the main frame 110 of the water purifier 1, but the present disclosure is not limited thereto. In addition, since the upper side of the filter housing 530 may be opened as the filter cap 520 is separated from the filter housing 530, the filter module 510 can be moved upward through the open top of the filter housing 530 to be replaced. The filter housing 530 may include a filter accommodating space 531, the housing coupling portion 532, the filter fixture 533, and a residual water outlet 534.

The filter accommodating space 531 may accommodate the filter module 510. The filter accommodating space 531 may be formed by coupling the filter housing 530 and the filter cap 520. In addition, the filter accommodating space 531 may be formed to contain the residual water discharged from the filter module 510 when the filter module 510 is replaced. It is possible to prevent residual water from falling onto electronic components such as the cooler 700 and the fan unit or from falling into the cold water flow part 900 by the filter accommodating space 531. In addition, in the state in which the filter module 510 accommodated in the filter accommodating space 531 is coupled to the filter fixture 533, a separation distance L1 between an inner wall of the rear side of the filter housing 530 opposite to the other side of the filter connector 512 and the filter connector 512 may be greater than an overlapping length L2 of the filter connector 512 and the filter fixture 533. In other words, the filter module 510 may be moved in the front and rear direction within the filter accommodation space 531 to be coupled to or removed from the filter fixture 533.

The housing coupling portion 532 may be coupled to the filter cap coupling portion 523. Further, the housing coupling portion 532 may be positioned between the plurality of filter fixtures 533.

The filter fixture 533 may provide a flow path for supplying raw water to the filter module 510 or discharging purified water provided from the filter module 510 to the outside of the filter housing 530. The purified water discharged from the filter fixture 533 may flow to the tubing assembly 600. The filter connector 512 may be disposed on the front side of the filter housing 530 to be detachably coupled to one side of the filter connector 512. The rear side of the filter fixture 533 may be selectively coupled to the filter mouse, and the lower end of the filter fixture 533 may be included in the tubing assembly 600 or connected to a tube 535 communicating with the tubing assembly 600. Such a tube may extend downward toward a bottom surface of the filter housing 530. In addition, the filter fixture 533 may be fixed to the filter housing 530 even in the state in which the filter module 510 is removed, regardless of whether the filter module 510 is coupled to the filter fixture 533.

The residual water outlet 534 is an opening for discharging the residual water contained in the filter accommodating space 531 to the outside of the filter housing 530. The residual water outlet 534 may be provided at a lower portion of the filter housing 530.

Referring to FIGS. 5 and 6 again, the tubing assembly 600 may connect the flow path module 200 with one or more of the outlet 112, the filter assembly 500, the cooler 700, and the cold water flow part 900. The purified water filtered by the filter module 510 may be introduced into the flow path module 200 through the tubing assembly 600. As another example, the cold water cooled in the cold water flow part 900 may be introduced into the flow path module 200 through the tubing assembly 600. In addition, the tubing assembly 600 may connect some of the plurality of water pipes 222, 221, and 223 of the flow path module 200. The tubing assembly 600 may provide a passage for water to flow. For example, one or more of raw water, purified water, cold water, and hot water may flow through the tubing assembly 600.

The tubing assembly 600 may be disposed below the bracket 300, and may be selectively connected to the flow path module 200 seated on the bracket 300. In addition, the tubing assembly 600 may communicate with the plurality of water pipes 222, 221, and 223 when connected to the flow path module 200. In this case, the tubing assembly 600 may form a water flow path together with the flow path module 200. For example, purified water and cold water may flow along a water flow path between the tubing assembly 600 and the flow path module 200 and alternately flow between the tubing assembly 600 and the flow path module 200.

The cooler 700 may provide cold water by cooling purified water to a predetermined temperature or less. The cooler 700 may be disposed above the cold water flow part 900, and the cold water discharged from the cooler 700 may flow to the cold water flow part 900.

The heater 800 may provide hot water by heating purified water to a predetermined temperature or more. The hot water discharged from the heater 800 may flow to the tubing assembly 600.

The cold water flow part 900 may provide a space through which cold water provided from the cooler 700 flows. In addition, the cold water flow part 900 may provide a space for storing the cold water cooled by the cooler 700. For example, the cold water flow part 900 may be configured in the form of a water tank to provide a space in which cold water flows and a space in which cold water is stored. In addition, as another example, the cold water flow part 900 may be configured in the form of a thin pipe or a water tank with partition walls installed therein to provide a space in which purified water flows as soon as it is cooled.

The NOS valve 1000 may be operated to control the flow rate of raw water introduced from the outside. For example, the NOS valve 1000 may be a valve capable of opening and closing a raw water flow path which guides raw water to the filter module 510, and may control the flow rate of raw water by opening and closing a passage through which raw water flows. In other words, the NOS valve 1000 may be disposed at an upstream side of the filter module 510. The driving of the NOS valve 1000 may be controlled by the circuit board 1100. The NOS valve 1000 may be disposed at a position adjacent to the tubing assembly 600.

The circuit board 1100 may control the operation of the tubing assembly 600. For example, the circuit board 1100 may control the NOS valve 1000 to open the passage through which raw water flows. The circuit board 1100 may include a plurality of boards and a plurality of wires, and may be fixedly supported on the cover frame 120. Accordingly, the circuit board 1100 may rotate together with the cover frame 120 when the cover frame 120 is separated from the bracket 300. The circuit board 1100 can be easily exposed to the outside by being separated together with the cover frame 120. In addition, since the circuit board 1100 is fixedly supported on the main frame 110 while being separated together with the cover frame 120, the circuit board 1100 can be easily maintained. The circuit board 1100 may be implemented by an arithmetic device including a microprocessor, a measurement device such as a sensor, and a memory, and since the implementation method is obvious to those skilled in the art, further detailed descriptions will be omitted.

Hereinafter, the operation and effect of the water purifier 1 according to one embodiment of the present disclosure will be described.

A user can use the water purifier 1 according to an embodiment of the present disclosure to filter water supplied from the outside. The water purifier 1 can provide purified water to the user by filtering raw water. In addition, the water purifier 1 can provide cold water or hot water to the user by cooling or heating the purified water according to the user's selection.

In addition, the filter module 510 can be moved in the front and rear direction in a state in which it is accommodated in the filter receiving space 531 of the filter housing 530 to be coupled to or separated from the filter fixture 533, so that the user can easily replace the filter module 510. In other words, the user can separate the filter module 510 from the filter fixture 533 simply by pushing the filter module 510 rearward in the filter housing 530. In addition, in a state in which the upper cover of the frame 100 and the filter cap 140 are separated upward and the filter module 510 is separated from the filter fixture 533, the filter module 510 can be moved upward to be replaced, so that the filter module 510 can be easily replaced even if the distance between the main frame 110 and the filter housing 530 is narrow.

In addition, when the upper cover of the main frame 110 is opened, the filter module 510 and the flow path module 200 can be simultaneously replaced in the same direction (e.g., upward), so that the user can easily and quickly replace the filter module 510 and the flow path module 200.

Although the embodiments of the present disclosure have been described as specific embodiments, these are merely examples. The present disclosure is not limited to the above, and should be interpreted as having the widest scope according to the technical idea disclosed in the present specification. Those skilled in the art may combine/substitute the disclosed embodiments to implement a pattern of a shape not disclosed, but this also does not depart from the scope of the present disclosure. In addition, those skilled in the art may easily change or modify the disclosed embodiments based on the present specification, and it is clear that such changes or modifications also fall within the scope of the present disclosure.

What is claimed is:

1. A water purifier comprising:
   a filter module including a plurality of filters for filtering raw water to provide purified water, and a filter connector having a filter connection passage that allows the plurality of filters to communicate with each other;
   a filter housing providing a filter accommodating space for accommodating the filter module therein, wherein a top of the filter housing is opened, and the filter module moves in an up and down direction so that the filter module is accommodated in the filter housing; and
   a main frame configured to accommodate the filter housing,
   wherein the filter housing includes a filter fixture that is detachably coupled to one side of the filter connector, the filter fixture providing a flow path for supplying the raw water to the filter module or discharging the purified water provided from the filter module to an outside of the filter housing, and
   wherein in a state in which the filter module accommodated in the filter accommodating space is coupled to the filter fixture, a separation distance between the filter connector and an inner wall of the filter housing facing another side of the filter connector is greater than an overlapping length of the filter connector and the filter fixture,
   wherein the filter module is configured to move in a direction away from the filter connector within the filter accommodating space to be detached from the filter connector.

2. The water purifier of claim 1, wherein the filter module is accomodated in the main frame in the state in which the filter module is coupled to the filter fixture or in a state in which the filter module is separated from the filter fixture.

3. The water purifier of claim 1, further comprising:
   a filter cap configured to be selectively coupled to the filter housing on an upper side of the filter housing to form the filter accommodating space with the filter housing.

4. The water purifier of claim 3, wherein the filter cap includes a seating rib protruding downward, and
   wherein the seating rib interferes with the filter module when the filter module is separated from the filter fixture, and
   wherein the seating rib prevents the filter module from being separated from the filter fixture when the filter module is coupled to the filter fixture.

5. The water purifier of claim 4, wherein the filter fixture is provided as a plurality of filter fixtures,
   wherein the filter housing further includes a housing coupling portion located between the plurality of the filter fixtures,
   wherein the filter cap further includes a filter cap coupling portion for being coupled to the housing coupling portion, and
   wherein one of the housing coupling portion and the filter cap coupling portion is a coupling protrusion, and another of the housing coupling portion and the filter cap coupling portion is a coupling groove into which the coupling protrusion is to be inserted.

6. The water purifier of claim 4, wherein in a state in which the filter cap is coupled to the filter housing, the filter connector is disposed between the filter fixture and the seating rib.

7. The water purifier of claim 4, wherein the filter connector further includes a plurality of filter support parts engaged with the plurality of filters, respectively, to connect the filter connection passage and the plurality of filters, and wherein the seating rib includes:

a first rib part that surrounds each of peripheral surfaces of the plurality of filter support parts in the state in which the filter module is coupled to the filter fixture; and a second rib part disposed at another side than the filter connection passage in the state in which the filter module is coupled to the filter fixture.

* * * * *